Sept. 29, 1953
W. R. MEYER ET AL
2,653,502
WORK HANDLING APPARATUS FOR CRANKSHAFT LATHES
Filed May 24, 1951
6 Sheets-Sheet 1

INVENTORS.
WALTER R. MEYER AND
HAROLD J. SIEKMANN
BY
ATTORNEY.

INVENTORS.
WALTER R. MEYER AND
HAROLD J. SIEKMANN
BY
ATTORNEY.

Sept. 29, 1953 W. R. MEYER ET AL 2,653,502
WORK HANDLING APPARATUS FOR CRANKSHAFT LATHES
Filed May 24, 1951 6 Sheets-Sheet 3

INVENTORS.
WALTER R. MEYER AND
HAROLD J. SIEKMANN
BY
ATTORNEY.

INVENTORS.
WALTER R. MEYER AND
HAROLD J. SIEKMANN
BY Willard S. Grouse
ATTORNEY.

Patented Sept. 29, 1953

2,653,502

UNITED STATES PATENT OFFICE 2,653,502

WORK HANDLING APPARATUS FOR CRANKSHAFT LATHES

Walter R. Meyer and Harold J. Siekmann, Cincinnati, Ohio, assignors to The R. K. Le Blond Machine Tool Co., Cincinnati, Ohio, a corporation of Delaware Application May 24, 1951, Serial No. 228,051

5 Claims. (Cl. 82—2.5)

This invention pertains to improvements in work handling mechanisms and apparatus for loading and unloading work in machine tools. More particularly this invention is directed to a loading apparatus for presenting work on the work spindles and removing it from the work spindles of crankshaft machine tools, such as orbital crankshaft turning lathes, crankshaft grinding machines and other related machine tools.

One of the objects of this invention is to provide an automatic loading and unloading device for a crankshaft lathe.

Another object of this invention is to provide an improved work handling mechanism for a multiple spindle orbital crankshaft turning lathe such, for example, as illustrated in Patent 2,138,964 having work engaging chucking devices such as illustrated in Patent 2,030,142.

Still another object of this invention is to provide a work handling apparatus for a multiple spindle orbital lathe by which finished workpieces are removed from the work spindles and rough unmachined workpieces automatically loaded into said spindles without any attention or effort upon the part of the operator except that of operating the push button control mechanism.

Still another object of this invention is to provide an automatic loading device for simultaneously presenting a plurality of workpieces on the work spindles or removing said plurality of workpieces from said work spindles of a multiple spindle crankshaft turning lathe.

Still another object of this invention is to provide an automatic loading device for a crankshaft turning lathe in which one or more crankshafts are swung from a removed position of axial travel in an arcuate path to loading position on the axis of rotation of the spindle or spindles of a crankshaft turning lathe.

Still another object of this invention is to provide an automatic crankshaft loading and unloading device for a crankshaft lathe which supports the work crankshafts in a predetermined indexed position for presenting said crankshafts in a particular predetermined indexed position while loading and removing the crankshafts from the work spindles of the crankshaft lathe.

Still another object of this invention is to provide a loading device for a crankshaft lathe in which the work crankshaft is held in a particular predetermined oriented position around its main axis of rotation so as to position a series of premachined locating spots on the webs of the crankshaft in a predetermined relative position to the locating pads in the chucking devices during the loading and unloading operation.

A still further object of this invention is to provide a loading device for an orbital crankshaft lathe in which a plurality of crankshafts are held in a predetermined indexed position about the main bearing axes while being moved from an upward retracted position for axial movement away from the work spindles of the machine, through an arcuate path to present said crankshafts on the axis of the work spindles while at all times maintaining said crankshafts in said predetermined indexed position, and then to provide further means for vertically raising and lowering said handling mechanism for depositing or releasing the loading mechanism from the work crankshafts when in the work spindle chucks of the lathe.

Further features and advantages of this invention will appear from a detailed description of the drawings in which:

Fig. 1 is a front elevation of the improved work handling mechanism as applied to a multiple spindle orbital crankshaft lathe.

Figure 2:
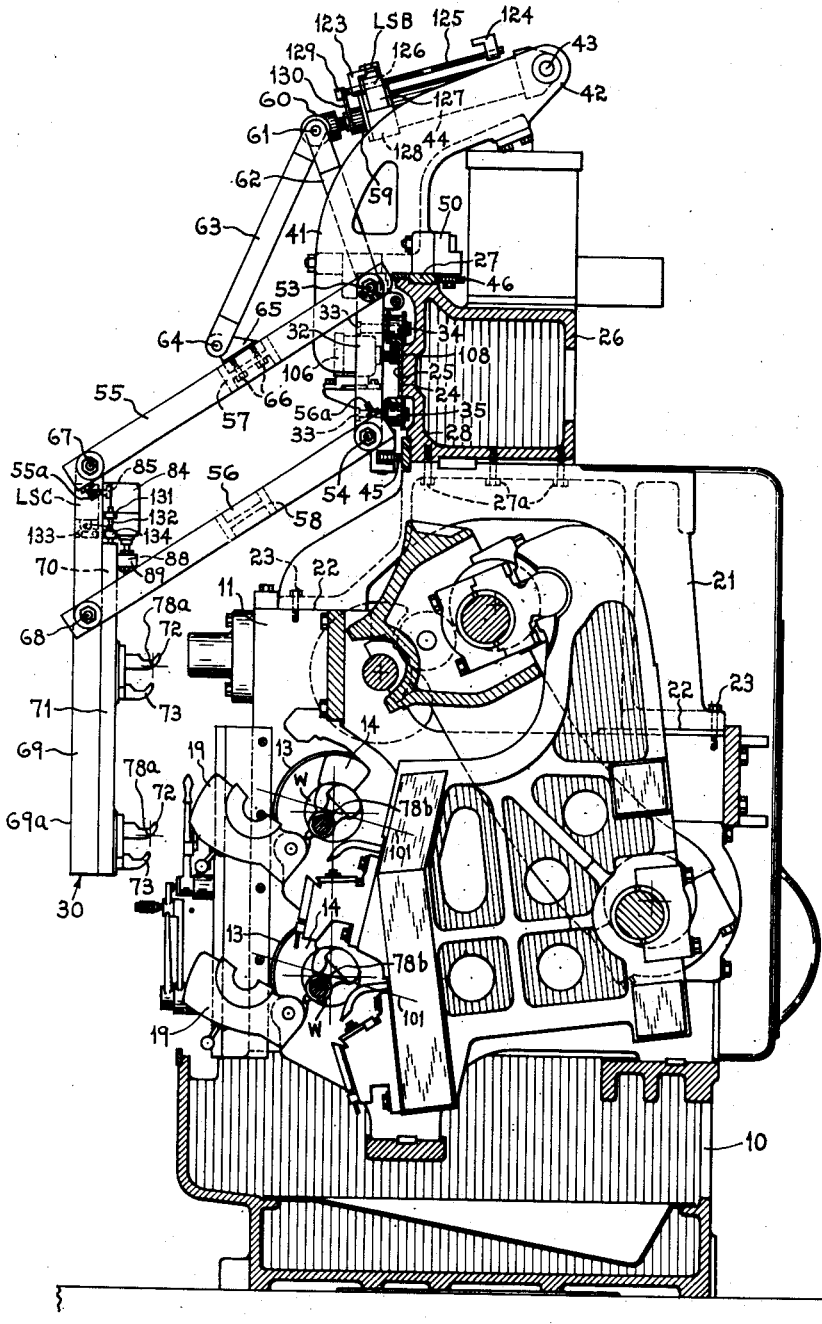
Fig. 2 is a transverse vertical section through the machine and apparatus of Fig. 1 indicated by the line 2—2 in Fig. 1.
Figure 2A:
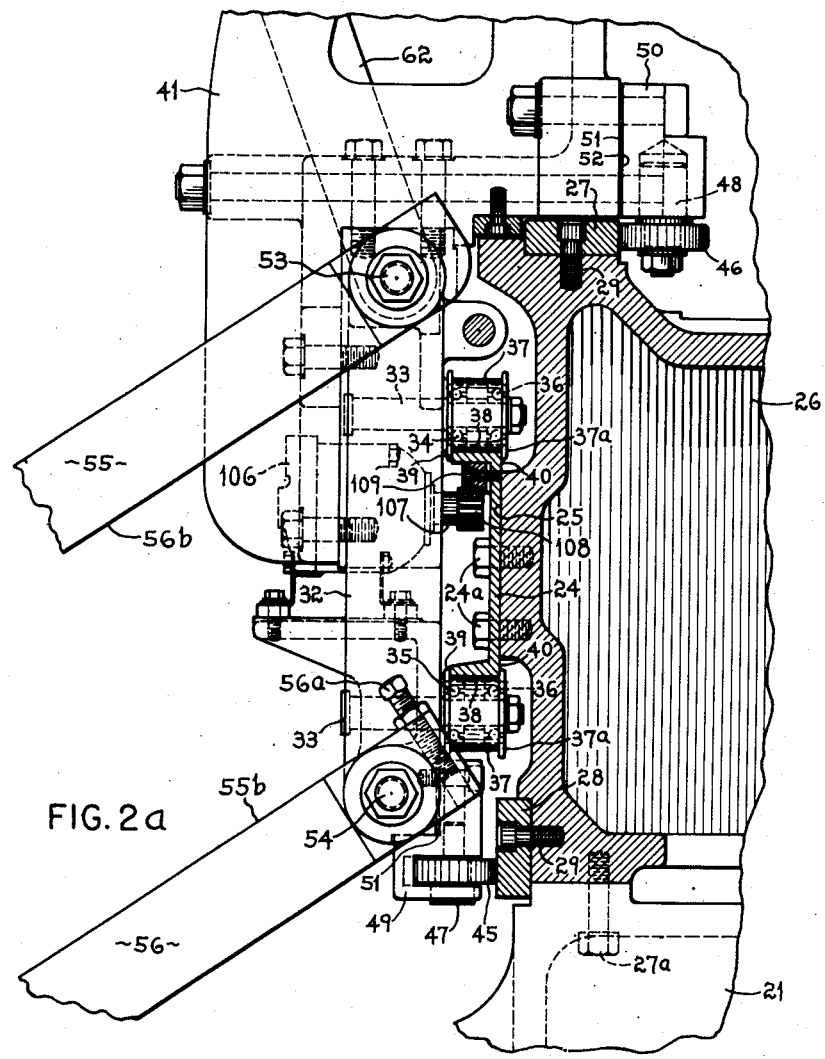
Fig. 2a is an enlarged fragmentary section on the line 2a—2a of Fig. 1.

As illustrative of one preferred embodiment of this invention there is shown the work handling apparatus applied to a multiple spindle orbital crankshaft turning lathe such as illustrated in Patent 2,138,964 having a base 10 and a pair of upright end housings 11 and 12 in which are journaled the work spindles 13 having power operated chucking devices 14 for gripping the flange and stub end portions 15 and 16 of the work crankshafts W as shown for example in Patent 2,030,142. The intermediate line bearing portions 17 and 18 are supported in the usual steady rests 19 and 20 as fully illustrated and described in the aforementioned patents.

Figure 3A:
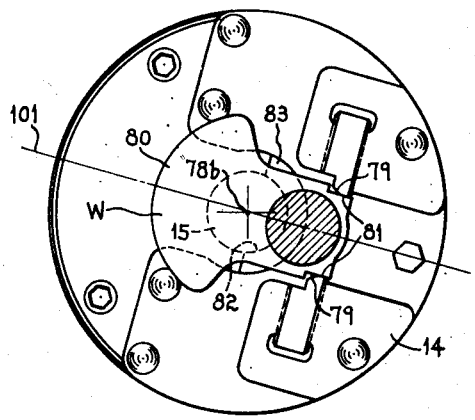
Fig. 3a is an enlarged section on the line 3a—3a of Fig. 1.
Figure 3:
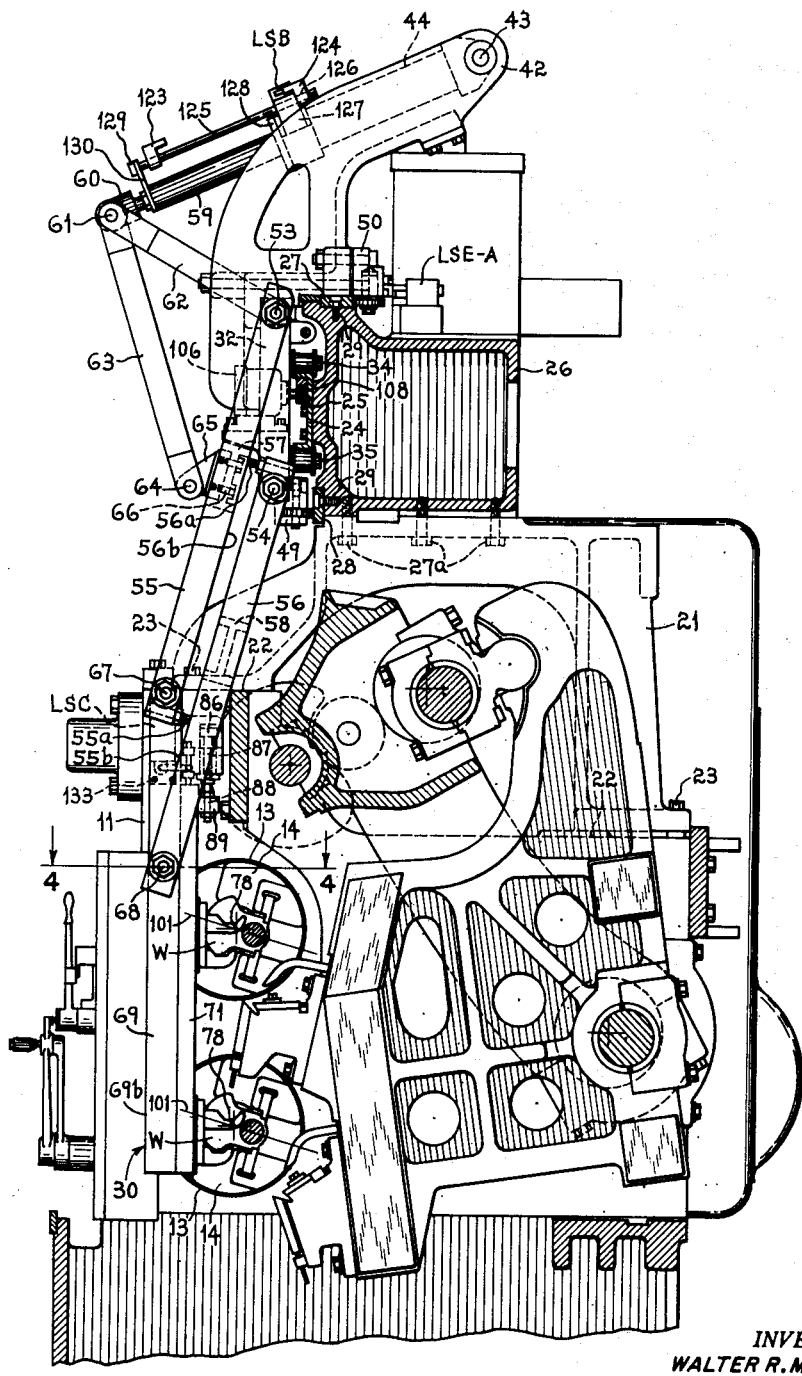
Fig. 3 is an enlarged sectional view of the loading device shown in loading and unloading position as indicated by the line 3—3 in Fig. 1.

On top of each of the housings 11 and 12 of the machine are fixed the supporting pedestals 21 each of which are secured to the top surfaces 22 of the housings 11 and 12 by suitable screws 23 so as to form rigid supports for the traveling crane rail 24, Fig. 3, which is secured by screws 24a to the surface 25 on the box shaped longitudinally extending housing 26 in turn secured to the pedestals 21 by suitable screws 27a. Also extending longitudinally of the member 26 are the upper and lower precise alignment guide rails 27 and 28 rigidly secured to the member 26 by suitable screws 29.

In the arrangement here illustrated there are two complete loading crane devices indicated generally at 30 and 31 and each of substantially identical construction so that a detailed description of one of the devices will suffice for both. Each of the cranes comprises a truck member 32 in which are fixed the roller pins 33 which project rearwardly and support the load carrying rollers 34 and 35 on suitable anti-friction bearings 36, each of the rollers 34 and 35 having diametral portions 37 rolling on the edge surfaces 38 of the crane rail 24 and having side flanges 37a engaging the side faces 39 and 40 of the rail 24 so as to provide means for carrying the crane in a horizontal lateral movement to one side or the other of the machine structure. Fixed to the truck member 32 is the elevator cylinder carrying bracket 41 which projects upwardly and rearwardly terminating in a supporting bifurcated end 42 which carries the pivot pin 43 for the rear portion of the elevating cylinder 44.

In addition the aforementioned load carrying rollers 34 and 35 there are provided the supplemental precise alignment rollers 45 and 46 each of which are journaled on the respective pins 47 and 48 on suitable blocks 49 and 50 respectively which may be nicely adjusted by suitable shims 51 relative to the truck member 32 and the surface 52 of the elevating cylinder arm bracket 41. Each of the rollers 45 and 46 respectively engage the precise alignment guide bars 28 and 27 respectively so that by carefully adjusting the shims 51, the exact position of the truck 32 may be maintained during its lateral movement along the rail 24.

Pivotally mounted about suitable rock shafts 53 and 54 are the parallel motion producing arms 55 and 56 which are preferably connected together by suitable tie means 57 and 58. The downward and inward swinging motion of the arms 55 and 56 is limited to precise position, as indicated in Fig. 3, by engagement of the abutment screw 55a with the surface 55b of the arm 56, and engagement of the abutment screw 56a with the surface 56b of the arm 55, both of the screws 55a and 56a being adjustably mounted in the respective arms 55 and 56 so that the precise predetermined location of the inner swinging movement of the arms can be effected.

The cylinder 44 contains a piston rod 59 having an eye bolt 60 which is pivotally mounted at 61 to the link 62 which in turn is pivotally mounted about the rock shaft 53 and is also pivotally connected at 61 to a link 63 which in turn is pivotally connected at 64 to a bracket 65 rigidly secured to the cross member 57 of the upper arms 55 by suitable screws 66. The outer ends of the arms 55 and 56 terminate respectively in pivotal connections at 67 and 68 connected to the work supporting carriage 69. Thus by this arrangement actuation of the fluid pressure cylinder 44 causes the arms 55 and 56 to swing from the retracted unloaded position 69a, as shown in Fig. 2, to the loading position 69b, as shown in Fig. 3, while at all times maintaining exact parallelism of movement of the member 69 during the swinging movement to and from the position 69a to 69b and return.

Figure 4:
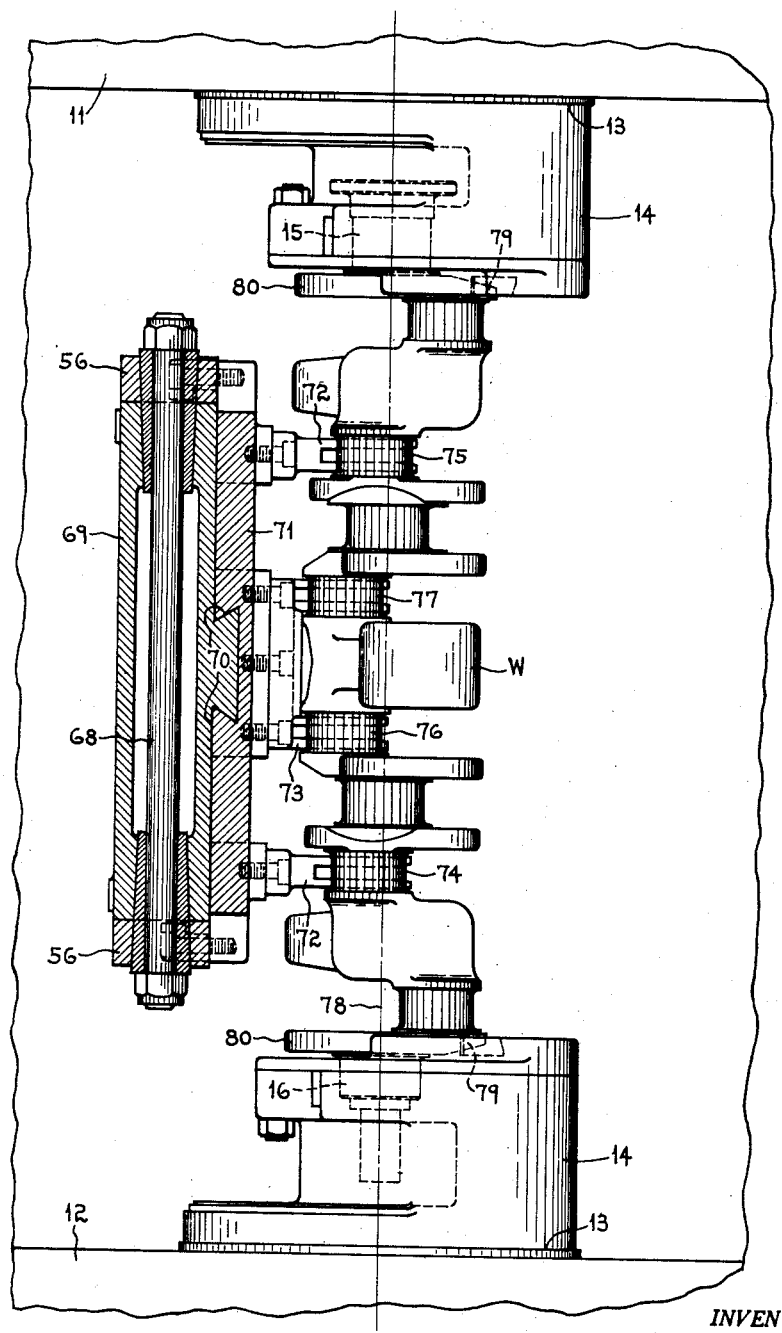
Fig. 4 is a horizontal section through one of the loading devices as indicated by the line 4—4 in Figs. 1 and 3.

Mounted for vertical sliding movement on the carriage 69 by means of suitable dove tail guide ways 70 is the work engaging hook carrying slide 71 upon which is rigidly fixed the work engaging hooks 72 and 73 as best seen in Figs. 2, 3, and 4. It is to be noted that the hooks 72, Fig. 4, engage the Nos. 2 and 5 crank pins 74 and 75 while the supporting hooks 73 engage the intermediate crank pins Nos. 3 and 4 indicated at 76 and 77 so as to hold the crankshafts in a predetermined indexed position relative to its main line bearing axis of rotation 78. Thus the locating spots 79 that have been premachined on the crankshaft are thus held in a predetermined indexed position relative to the line bearing axis 78 as the work crankshaft is moved from the position 78a to the position 78b on the axis of rotation of the chucks 14 and work spindles of the lathe. Thus in this manner the locating spots 79 on the crankshaft terminal webs 80 are properly aligned so as to enter between the locating surfaces 81 fixed in the chucks 14 while at the same time the flange and stub end line bearings portions 15 and 16 will properly enter into seating engagement with the arcuate surface 82 formed in the half bushing 83 fixed in the chucks 14.

In order to release the crankshafts from the hooks after they have been deposited in the chucks 14 or to permit placement of the hooks under a completed workpiece for removal of the crankshaft from the chucks the hook carrying slide 71 is arranged to have limited vertical movement on the dove tail guide ways 70 by means of the hook actuating cylinders 84 which are securely fixed by suitable screws 85 to the carriage member 69 and have a piston 86 and a piston rod 87 connected through suitable connection means at 88 to a lug 89 formed integral with the slide 71. When the piston 86 is moved to its upper position the hooks are engaged under the respective crank pins as described to hold the crankshaft in the desired indexed position for insertion into or removal from the chucks 14 and held in this position during the swinging motion of the carriage 69 from position 69a to 69b and return. When the piston 86 is moved downwardly to its lower position to travel the hooks are free of the crankshaft so that the crankshafts will be left deposited in the chucks or on the loading and unloading rail arrangements indicated generally at 90 and 91 so that the hook mechanisms may be swung away from the chucks or loading and unloading arrangements 90 and 91 without moving the crankshafts. Further, whenever the crankshafts are supported on the hooks and in the position 78a with the carriages swung outwardly as best shown in Fig. 2, the crane may be moved longitudinally along the rail 24 to position crankshafts with regard to the work spindles and chucks 14 and the loading and unloading racks 90 and 91. Each of the racks 90 and 91 respectively support rough and finished crankshafts WR and WF with their line bearing axes on the axis or rotation 78 of the chucks 14 and the work spindles of the machine. The unfinished crankshaft supporting rack constituting the members 92 and 93 constituting a suitable supporting frame work has supporting rails 94 and 95 which engage the intermediate pin bearings of the crankshaft so that they slide down to a forward position and come to a stop with these intermediate bearing portions in such a position that they may be gripped by the hooks 72 and 73 as described to properly orient the crankshafts in indexed position necessary to enter the chucks 14 as recited above. The unloading or finishing rack comprises suitable supporting members 96 and 97 upon the latter of which are provided rails 98 which engage the terminal line bearing portions 15 and 16 of the crankshaft and slope away from the machine so that the crankshafts when deposited roll back to a conveyor at the rear of the machine to be conducted away for subsequent operations. Each of the loading crane devices 30 and 31 are rigidly interconnected by a tie rod 99 secured by suitable bolting means at 100 to each of the crane devices so that both of the cranes move laterally along the rail 24 in unison so that when one device is in position in front of the work spindles of the machine the other device is at either of the loading or unloading racks.

Figure 5:
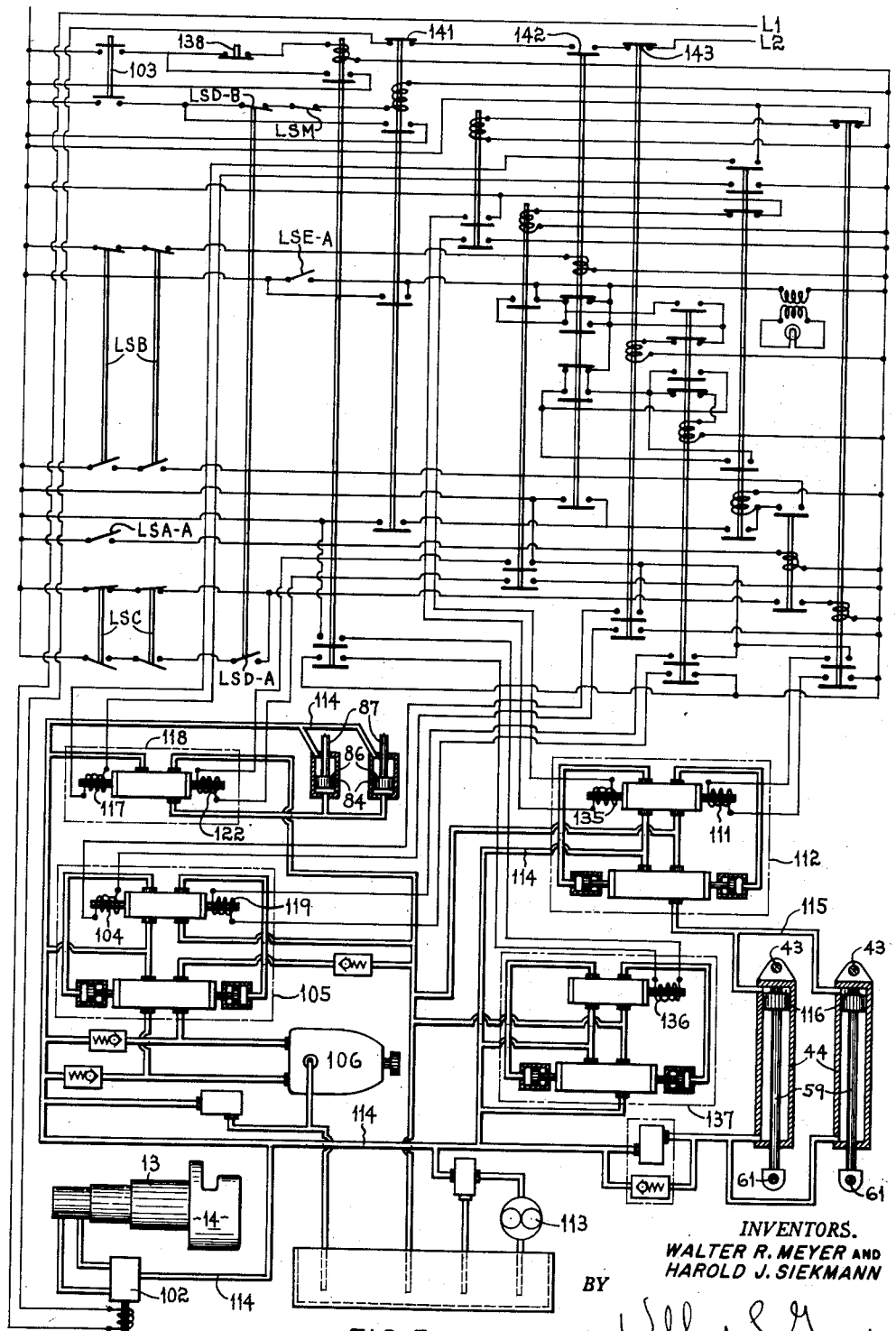
Fig. 5 is the electric-hydraulic control circuit diagram for the work handling apparatus.

The operation of the work handling apparatus is substantially as follows: During the normal turning and cutting operation of the lathe the loading devices are positioned at an intermediate location each end of the rail 24 as best shown in Fig. 1, with each device swung outwardly and being positioned in front of the end housings 11 and 12 of the lathe. At the conclusion of the cutting cycle the chucks 14 and work spindles are stopped in a predetermined position 101 by a well known mechanism forming no part of this invention. The operator then energizes the chuck control valve 102 by applying power in a suitable manner from the lines L1 and L2, Fig. 5, to open the chucking devices and release the crankshafts therefrom.

To unload the completed crankshafts and insert new unmachined crankshafts in the lathe, the operator presses the load push button 103 for the automatic loader to start its cycle to cause solenoid 104 of the traverse control valve 105 to be energized so as to apply fluid pressure to the traverse motor 106 which is rigidly mounted on the truck member 32 of the crane 31 and has an output shaft 107 upon which is rigidly fixed a pinion 108 which engages the rack 109 fixed on the rail 24 so as to cause the crane 31 and through the tie rod 99 the crane 30 to both move simultaneously to the right, Fig. 1, so as to bring the left hand crane 30 in front of the work spindles of the lathe while presenting the right hand crane 31 to the rough unfinished crankshaft workpiece supply rack 90. When the cranes have reached their extreme right position the limit switch LSA–A is actuated by an abutment screw 110 to energize the solenoid 111 of the elevating cylinder's control valve 112 so that fluid pressure will then be supplied from the hydraulic pump 113 and the pressure supply line 114 to the line 115 to apply pressure against the piston head end chambers 116 of the elevating cylinder 44 to cause the carriages 69 to move toward the work spindles and chucks 14 and the loading rack 90 of the machine. At this time the hook slide 71 is in lowered position as the hooks are swung downwardly and inwardly to engage the finished crankshafts in the chucking devices 14 and the rough unfinished crankshafts on the loading rack 90.

At the end of the lowering and swinging in movement of the carriages 69, with the hooks 72—73 in lowered position, the limit switch LSB is actuated to energize solenoid 117 of the hook control valve 118 so as to actuate the cylinders 84 to cause the respective hooks to be raised to engage the crankshafts in the chucks and on the loading rack 90. At the conclusion of the up stroke of the slide 71 and the hooks 72—73 in picking up the crankshafts, limit switch LSB is actuated whereupon solenoid 119 of valve 105 is energized so as to apply fluid pressure to the hydraulic traverse motor 106 to cause the cranes now carrying a pair of finished crankshafts on the left hand crane and a pair of unfinished rough crankshafts on the right hand crane, so as to bring the rough crankshafts in alignment with the work spindles and chucks 14 and to present the finished crankshafts in alignment with the unloading rack 91, both cranes traveling to the extreme left position where they are accurately stopped by engagement of the abutment screw 120 with the abutment block 121 fixed on the end of the rail 24, the abutment screw also at the same time actuating limit switch LSD–B which in turn causes energizing of solenoid 111 of the valve 112 so as to actuate the cylinders 44 to cause the hooks to swing downwardly to deposit the rough unmachined crankshafts in the chucks 14 and concurrently to bring the finished crankshafts into position over the unloading rails of the rack 91. At the conclusion of this downward and inward swinging movement of the carriages 69 the limit switch LSB is again actuated which now causes solenoid 122 of the valve 118 to be energized so that the hook slide 71 will be lowered so as to release the right hand crane from engagement with the rough crankshafts now deposited in the chucks and to deposit the finished crankshafts on the unloading rack 91, the limit switch LSB being actuated by suitable dogs 123 and 124 carried on a rod 125 guided in a suitable bearing 126 in a bracket 127 mounted on the cylinder head 128 of the cylinder 44, the rod 125 being fixed by suitable means such as the connection 129 to the piston rod 59 by means of the arm 130, as best seen in Figs. 2 and 3.

At the bottom of the stroke of the cylinder 84 for actuating the hook slide, the collar 131 fixed in suitable adjusted position on the pin 132 which in turn is fixed in the hook slide 71, actuates the limit switch LSC which is rigidly mounted on the work carrier 69 by suitable screws 133, as best seen in Fig. 2, the upward movement of the hook slide 71 actuating the limit switch LSC through the medium of the collar 134 also adjustably carried on the pin 132. As the hook slide reaches its lowered position the limit switch LSC is actuated to thus cause the solenoid 135 of the valve 112 to be energized so as to again elevate the work carriages 69 to retracted position where limit switch LSB is again actuated so that solenoid 104 will now be energized to apply fluid pressure to the traverse motor 106 to cause the cranes to travel to the right toward their intermediate neutral position during the machining operations on the crankshafts deposited in the chucks 14 of the machine. The cranes are automatically brought to rest in the center position by engagement of limit switch LSE–A which detains the loading devices in this position during the machining cycle until the operator again presses the load button at the completion of the machining cycle. Pressing of the load button 103 energizes the main control solenoid 136 of the main stop and start control valve 137 to put the system again in operation as stated and as shown in the diagram Fig. 5. At any time the operation of the loading device may be halted by pressing the stop loader button 138 to deenergize the main control valve 137. Suitable interlocking safety features are provided such as the limit switch LSM and the contactors 141, 142, and 143 to prevent operation of the chucking devices during the operation of the loading device and to prevent the reverse type of operation of the loading device when the machine is running and the work is chucked in the chucks 14 in a well known manner and forming no specific part of this invention.

While, for illustrative purposes, the above description is directed to the arrangement where rough crankshafts are initially presented at the right hand side of the machine and the finished shafts removed at the left hand side, it is obvious the opposite arrangement of presenting rough crankshafts at the left hand side could as well be done and would be within the intended scope and purview of this invention.

There has thus been provided an automatic work handling mechanism for a machine tool in which rough crankshafts are automatically picked up from a loading rack and at the same time removed from the chucking devices of the machine at the completion of the machining cycle and held and supported in a predetermined indexed position on the loading devices both during the depositing and after removal of the crankshafts from the lathe. Further, the device is operative automatically to replace finished machine shafts with new unmachined crankshafts and at the same time deposit completed shafts in an unloading rack without attention or skill upon the part of the operator.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed as new and desired to be secured by United States Letters Patent is:

1. A work handling device for a machine tool including, a frame, a horizontally disposed crane rail on said machine frame arranged parallel to the axis of rotation of the work spindle of the machine tool, a truck member, roller means on said truck member adapted to move laterally along said rail, a pair of parallel motion producing arms pivotally mounted at one of their ends on rock shafts located on said truck member, a vertically disposed work supporting carriage, means for pivotally mounting said carriage at the outer ends of said arms so that said arms may be swung upwardly and downwardly while maintaining said carriage in parallel vertical positions, a fluid pressure elevating cylinder interconnected between said truck and one of said arms to actuate said arms to effect said swinging movement of said work carriage member, a work engaging hook carrying slide vertically reciprocatable on said carriage, a hook actuating cylinder interconnected between said carriage and said slide for moving said slide to and from a predetermined upward vertical position on said carriage, and work engaging hooks on said slide adapted to engage a workpiece to hold said workpiece in a predetermined indexed position on said carriage.

2. A work handling device for a machine tool including, a frame, a horizontally disposed crane rail on said machine frame arranged parallel to the axis of rotation of the work spindle of the machine tool, a truck member, roller means on said truck member adapted to move laterally along said rail, a pair of parallel motion producing arms pivotally mounted at one of their ends on rock shafts located on said truck member, a vertically disposed work supporting carriage, means for pivotally mounting said carriage at the outer ends of said arms so that said arms may be swung upwardly and downwardly while maintaining said carriage in parallel vertical positions, a fluid pressure elevating cylinder interconnected between said truck and one of said arms to actuate said arms to effect said swinging movement of said work carriage member, a slide which is vertically reciprocatable on said carriage, a hook actuating cylinder interconnected between said carriage and said slide for moving said slide to and from a predetermined upward vertical position on said carriage, work engaging hooks on said slide adapted to engage a workpiece to hold said workpiece in a predetermined indexed position on said carriage, and abutment screw means between said arms to precisely limit downward movement of said work supporting carriage to a predetermined fixed position.

3. A work handling device for a machine tool including, a frame, a horizontally disposed crane rail on said machine frame arranged parallel to the axis of rotation of the work spindle of the machine tool, a truck member, roller means on said truck member adapted to move laterally along said rail, a pair of parallel motion producing arms pivotally mounted at one of their ends on rock shafts located on said truck member, a vertically disposed work supporting carriage, means for pivotally mounting said carriage at the outer ends of said arms so that said arms may be swung upwardly and downwardly while maintaining said carriage in parallel vertical positions, a fluid pressure elevating cylinder interconnected between said truck and one of said arms to actuate said arms to effect said swinging movement of said work carriage member, a slide which is vertically reciprocatable on said carriage, an actuating cylinder interconnected between said carriage and said slide for moving said slide to and from a predetermined upward vertical position on said carriage, work engaging hooks on said slide adapted to engage a workpiece to hold said workpiece in a predetermined indexed position on said carriage, abutment screw means between said arms to precisely limit downward movement of said work supporting carriage to a predetermined fixed position, and stop means on said slide operated by the movement of said slide to limit said upward movement to a precise predetermined position.

4. A work handling device for a machine tool including, a frame, a horizontally disposed crane rail on said machine frame arranged parallel to the axis of rotation of the work spindle of the machine tool, a truck member, means on said truck member adapted to move laterally along said rail upon movement of said truck machine, a plurality of parallel motion producing arm means pivotally mounted at one of their ends on rock shafts located on said truck member, a vertically disposed work supporting carriage, means for pivotally mounting said carriage at the outer ends of said arm means so that said arm means may be swung upwardly and downwardly while maintaining said carriage in parallel vertical positions, a fluid pressure elevating cylinder interconnected between said truck members and one of said arm means to actuate said arm means to effect said swinging movement of said work carriage member, a slide vertically reciprocatable on said carriage, an actuating cylinder interconnected between said carriage and said slide for moving said slide to and from a predetermined upward vertical position on said carriage, work engaging hooks on said slide adapted to engage a workpiece to hold said workpiece in a predetermined indexed position on said carriage, abutment screw means between said arm means to precisely limit downward movement of said work supporting carriage to a predetermined fixed position, and stop means on said hook carrying slide operated by the movement of said slide to limit said upward movement to a precise predetermined position.

5. A work handling machine for crankshaft lathes wherein crankshafts for machining may be unloaded from said lathe and loaded thereinto by machine elements operated in unison, said machine comprising a frame, a horizontally disposed crane rail on said frame arranged parallel to the axis of rotation of the work spindle of the lathe, a truck member, means on said truck member adapted to move laterally along said rail, a pair of parallel motion producing arm means pivotally mounted at one of their ends on rock shafts located on said truck member, a vertically disposed work supporting carriage, means for pivotally mounting said carriage on the outer ends of said arm means so that said arm means may be swung upwardly and downwardly while maintaining said carriage in parallel vertical positions, a fluid pressure operated cylinder means interconnected with said truck and said arm means for actuating said arm means to effect said swinging movement of said work supporting carriage member, a slide which is vertically reciprocable on said carriage, means interconnected with said carriage and said slide for moving said slide to and from a predetermined upward vertical position on said carriage, work engaging hooks mounted on said slide and adapted to engage and support a crankshaft in a predetermined indexed position on said carriage, and abutment screw means engageable by said arm means to precisely limit downward movement of said work supporting carriage to a predetermined fixed position.

WALTER R. MEYER.
HAROLD J. SIEKMANN.

References Cited in the file of this patent

UNITED STATES PATENTS

| Number | Name | Date |
| --- | --- | --- |
| Re. 18,559 | Smith et al. | Aug. 9, 1932 |
| 1,442,140 | Sears | July 11, 1922 |
| 1,700,721 | Groene | Jan. 29, 1929 |
| 1,794,424 | Smith et al. | Mar. 3, 1931 |
| 1,841,988 | Smith et al. | Jan. 19, 1932 |
| 1,933,225 | Smith | Oct. 31, 1933 |
| 1,933,226 | Smith et al. | Oct. 31, 1933 |
| 1,950,040 | Smith et al. | Mar. 6, 1934 |
| 2,004,540 | Smith et al. | June 11, 1935 |
| 2,191,347 | Groene et al. | Feb. 20, 1940 |
| 2,221,049 | Groene et al. | Nov. 12, 1940 |
| 2,233,309 | Groene | Feb. 25, 1941 |
| 2,233,993 | Campbell | Mar. 4, 1941 |
| 2,305,868 | Groene et al. | Dec. 22, 1942 |